United States Patent
Hwang

(10) Patent No.: US 9,347,788 B2
(45) Date of Patent: May 24, 2016

(54) NAVIGATION METHOD OF MOBILE TERMINAL AND APPARATUS THEREOF

(75) Inventor: Kyu-Tae Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 704 days.

(21) Appl. No.: 12/819,616

(22) Filed: Jun. 21, 2010

(65) Prior Publication Data

US 2011/0130959 A1    Jun. 2, 2011

(30) Foreign Application Priority Data

Dec. 1, 2009    (KR) .................. 10-2009-0118075

(51) Int. Cl.
*G08G 1/123*     (2006.01)
*G01C 21/36*     (2006.01)
*G06F 3/048*     (2013.01)

(52) U.S. Cl.
CPC ........ *G01C 21/3679* (2013.01); *G01C 21/3614* (2013.01)

(58) Field of Classification Search
CPC .................. G01C 21/3682; G01C 21/3611
See application file for complete search history.

(56) References Cited

U.S. PATENT DOCUMENTS

| | | | | |
|---|---|---|---|---|
| 6,278,940 B1* | 8/2001 | Endo | ................... | G01C 21/3611 340/988 |
| 2002/0065605 A1* | 5/2002 | Yokota | ............... | G01C 21/3682 701/438 |
| 2002/0138196 A1* | 9/2002 | Polidi | ................. | G01C 21/3682 701/409 |
| 2003/0182052 A1* | 9/2003 | DeLorme et al. | ............. | 701/201 |
| 2004/0243306 A1* | 12/2004 | Han | ................... | G01C 21/3682 701/438 |
| 2004/0243307 A1* | 12/2004 | Geelen | ............... | G01C 21/3635 701/469 |
| 2004/0254723 A1* | 12/2004 | Tu | ....................... | G01C 21/3679 701/410 |
| 2004/0260464 A1* | 12/2004 | Wong | ................. | G01C 21/3611 701/533 |
| 2005/0085999 A1* | 4/2005 | Onishi | ............... | G01C 21/3682 701/454 |
| 2005/0107949 A1* | 5/2005 | Yokota | ............... | G01C 21/3611 701/532 |
| 2005/0177303 A1* | 8/2005 | Han | ....................... | G01C 21/36 701/400 |
| 2006/0253247 A1* | 11/2006 | de Silva | ............. | G01C 21/3611 701/426 |
| 2007/0288161 A1* | 12/2007 | Neef | ....................... | G01C 21/26 701/532 |
| 2008/0154488 A1* | 6/2008 | Silva | ....................... | G01C 21/36 701/426 |
| 2008/0168398 A1* | 7/2008 | Geelen | ............... | G01C 21/3655 715/854 |
| 2008/0208447 A1* | 8/2008 | Geelen | .................. | G01C 21/34 701/533 |
| 2008/0228385 A1* | 9/2008 | Geelen | ............... | G01C 21/3641 701/533 |
| 2009/0055774 A1* | 2/2009 | Joachim | ................ | G06F 3/0483 715/810 |
| 2009/0216732 A1* | 8/2009 | Feng | ................. | G01C 21/3611 |
| 2010/0026526 A1* | 2/2010 | Yokota | ............. | G08G 1/096827 340/996 |

* cited by examiner

*Primary Examiner* — F. Zeender
*Assistant Examiner* — Dana Amsdell
(74) *Attorney, Agent, or Firm* — Birch, Stewart, Kolasch & Birch, LLP

(57) ABSTRACT

A mobile terminal and an method searches a point of interest (POI). The navigation apparatus of a mobile terminal includes a storage unit configured to store map data, a display unit configured to display the map data, and a controller configured to search a destination from the map data, display the searched destination on the display unit, and display an icon for searching points of interest near the destination.

12 Claims, 11 Drawing Sheets

NAVIGATION METHOD OF MOBILE TERMINAL AND APPARATUS THEREOF

CROSS-REFERENCE TO A RELATED APPLICATION

Pursuant to 35 U.S.C. §119(a), this application claims the benefit of earlier filing date and right of priority to Korean Application No. 10-2009-0118075 filed on Dec. 1, 2009, the contents of which are incorporated by reference herein in its entirety.

BACKGROUND OF THE INVENTION

1. Field of the Invention

The present invention relates to a navigation method of a mobile terminal and an apparatus thereof.

2. Background of the Invention

In general, a navigation apparatus generates road guide information based upon global positioning system (GPS) signals and map information, and provides the road guide information to a user.

SUMMARY OF THE INVENTION

A navigation apparatus of a mobile terminal according to embodiments of the present invention may include a storage unit configured to store map data; a display unit configured to display the map data; and a controller configured to search a destination from the map data, display the searched destination on the display unit, and display an icon for searching nearby points of interest (POI) of the destination on the displayed destination.

A navigation method of a mobile terminal according to embodiments of the present invention may include storing map data; displaying the map data on a display unit; searching a destination from the map data, and displaying the searched destination on the display unit; and displaying an icon for searching nearby points of interest of the destination on the displayed destination.

A navigation apparatus of a mobile terminal according to embodiments of the present invention may include a global positioning system (GPS) module configured to generate vehicle location data on the basis of a GPS signal received from a satellite; a map matching unit configured to match the vehicle location data with map data stored in a storage unit and output the matched information; a controller configured to generate road guide information on the basis of the matched information; a display unit configured to display a road guide map included in the road guide information; and an audio output unit configured to output road guide voice information included in the road guide information, wherein the controller searches a destination from the map data, displays the searched destination on the display unit, and displays an icon for searching nearby points of interest (POI) of the destination on the displayed destination.

A navigation method of a mobile terminal according to embodiments of the present invention, generating vehicle location data on the basis of a global positioning system (GPS) signal received from a satellite, matching the vehicle location data with map data stored in a storage unit, outputting the matched information, generating road guide information on the basis of the matched information, displaying a road guide map included in the road guide information on a display unit, and outputting road guide voice information included in the road guide information, may further include searching a destination from the map data and displaying the searched destination on the display unit; and displaying an icon for searching nearby points of interest of the destination on the displayed destination.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, preferred embodiments of a navigation method of a mobile terminal and an apparatus thereof capable of effectively searching a point of interest (POI) will be described in detail with reference to FIGS. 1 through 16.

Figure 1:
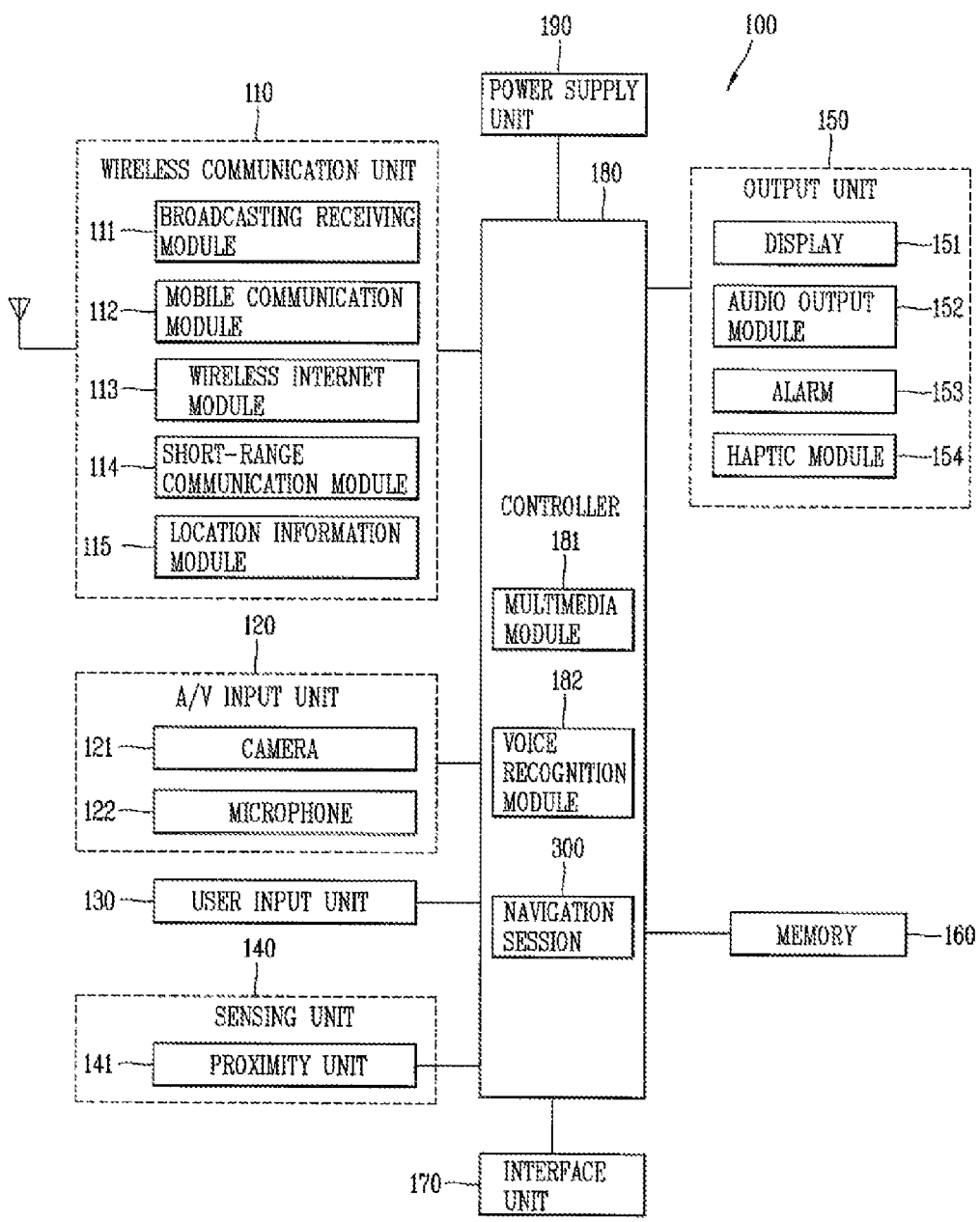
FIG. 1 is a block diagram illustrating a configuration of a mobile communication terminal for explaining an embodiment of the present invention.

FIG. 1 is a block diagram illustrating a configuration of a mobile communication terminal 100 for explaining an embodiment of the present invention. The mobile terminal (mobile phone) 100 may be implemented in various forms. For example, there are mobile communication terminals 100 such as portable phone, smart phone, notebook computer, digital broadcast receiver, personal digital assistant (PDA), portable multimedia player (PMP), and the like. All components of the terminal 100 are operatively configured and coupled.

As illustrated in FIG. 1, the mobile communication terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. All the elements of the mobile communication terminal 100, as illustrated in FIG. 1, are not necessarily required, and therefore, the mobile communication terminal 100 may be implemented with greater or less elements than the elements as illustrated in FIG. 1.

The wireless communication unit 110 typically includes one or more elements allowing radio communication between the mobile communication terminal 100 and a wireless communication system, or allowing radio communication between radio communication the mobile communication terminal 100 and a network in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile communication terminal 100. The broadcast associated information may mean information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile communication terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 means a module for supporting a short-range communication. Here, it may be used a short-range communication technology including Bluetooth, Radio Frequency Identification (RFID), Infrared Data Association (IrDA), Ultra WideBand (UWB), ZigBee, and the like.

The location information module 115 is a module for checking or acquiring a location of the mobile terminal. A GPS module is an example. The GPS module receives location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system may be applicable.

The A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 (or other storage medium) or transmitted through the wireless communication unit 110. Two or more cameras 121 may be provided according to the configuration type and/or use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal. The user input unit 130 may be configured by including a keypad, a dome switch, a touch pad (pressure/capacitance), a jog wheel, a jog switch, and the like. Particularly, when the touch pad forms an interlayer structure together with a display unit 151, it may be called a touch screen.

The sensing unit 140 detects a current status of the mobile communication terminal 100 such as an opened or closed state of the mobile communication terminal 100, a location of the mobile communication terminal 100, the presence or absence of user contact, an orientation of the mobile communication terminal 100, an acceleration or deceleration movement of the mobile communication terminal 100, and the like, and generates a sensing signal for controlling the operation of the mobile communication terminal 100. For example, when the mobile communication terminal 100 is a slide phone type, it may sense an opened or closed state of the slide phone. Furthermore, the sensing unit 140 takes charge of a sensing function associated with whether or not power is supplied from the power supply unit 190, whether or not an external device is coupled with the interface unit 170.

The interface unit 170 performs a role of interfacing with all external devices connected to the mobile communication terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. Here, the identification module may be configured as a chip for storing various information required to authenticate an authority for using the mobile communication terminal 100, which may include a User Identity Module (UIM), a Subscriber Identity Module (SIM), a Universal Subscriber Identity Module (USIM), and the like. Also, the device provided with the identification module (hereinafter, referred to as 'identification device') may be implemented in the type of a smart card. Hence, the identification device can be coupled to the mobile communication terminal 100 via a port. The interface unit 170 may receive data or power from an external device and transfer the received data or power to each constituent element in the mobile communication terminal 100, or transmit data within the mobile communication terminal 100 to the external device.

The output unit 150 is configured to provide an output for audio signal, video signal, or alarm signal, and the output unit 150 may include the display unit 151, an audio output module 152, an alarm unit 153, and the like.

The display unit 151 may display or output information processed in the mobile communication terminal 100. For example, when the mobile communication terminal 100 is in a phone call mode, the display unit 151 may display a User Interface (UI) or a Graphic User Interface (GUI) associated with a call. When the mobile communication terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

There may exist two or more display units 151 according to its embodiment. For example, an external display unit (not shown) and an internal display unit (not shown) are simultaneously provided in the mobile communication terminal 100.

Meanwhile, when the display unit 151 and a sensor for detecting a touch operation (hereinafter, 'touch sensor') are formed with an interlayer structure (hereinafter, 'touch screen'), the display unit 151 may be also used as an input device in addition to an output device. The touch sensor may be configured in a form of, for example, touch film, touch sheet, touch pad, or the like.

Furthermore, the touch sensor may be configured to convert a change such as pressure applied to a specific area of the display unit 151 or capacitance generated on a specific area of the display unit 151 into an electrical input signal. The touch sensor may be configured to detect a touch input pressure as well as a touch input position and a touch input area. When there is a touch input to the touch sensor, a signal (or signals) corresponding to the touch input is sent to a touch controller (not shown). The touch controller processes the signal (or signals) and then sends the corresponding data to a controller 180. By this, the controller 180 may know whether or not any region is touched on the display unit 151.

Hereinafter, a proximity sensor 141 of a mobile communication terminal 100 will be described with reference to FIG. 2.

Figure 2:
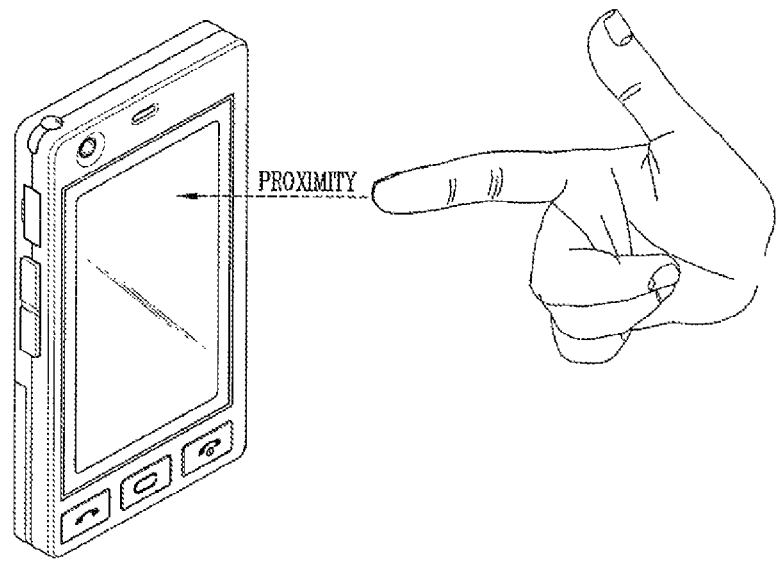
FIG. 2 is a view illustrating a proximity touch process of a mobile communication terminal.

FIG. 2 is a view illustrating a proximity-touch process of a mobile communication terminal 100. In the present invention, a proximity-touch means a state that a pointer approaches to a screen while being apart a predetermined distance from the screen without actually touching the screen.

The proximity sensor 141 may be arranged in an inner region of the mobile terminal 100 surrounded by a touch screen or may be arranged adjacent to the touch screen. The proximity sensor 141 is a sensor for detecting the presence or absence of an object approaching to a certain detection surface or an object that exists nearby by using the force of electromagnetism or infrared rays without a mechanical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. When the touch screen is an electrostatic type, the approach of a pointer can be detected based on a change in a field according to the approach of the pointer. In this case, the touch screen (touch sensor) may be classified as a proximity sensor.

In the following description, for the sake of brevity, recognition of the pointer positioned to be close to the touch screen, although the pointer is not actually brought into contact with the touch screen, will be called a "proximity touch", while recognition of actual contacting of the pointer on the touch screen will be called a "contact touch". The position where the pointer is proximately touched on the touch screen means a position where the pointer is positioned to correspond vertically to the touch screen when the pointer is proximately touched.

Furthermore, the proximity sensor 141 can detect a proximity touch, and a proximity touch pattern (for example, a proximity touch distance, a proximity touch direction, a proximity touch speed, a proximity touch time, a proximity touch position, a proximity touch movement state, or the like). Information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may output an audio signal associated with the function performed by the mobile terminal 100 (for example, a call signal reception sound, a message reception sound, etc.). The audio output module 152 may include a receiver, a speaker, a buzzer, and the like.

The alarm unit 153 may output a signal to notify the occurrence of an event of the mobile terminal 100. Examples of the event occurred in the mobile terminal 100 may include call signal reception, message reception, a key signal input, a touch input, and the like. In addition to an audio or video output, the alarm unit 153 may output a signal in a different manner to notify the occurrence of an event. For example, the alarm unit 153 may output in a form of vibration. When a call signal or message is received, the alarm unit 153 may vibrate the mobile terminal 100 through vibration means. When a key signal is inputted, the alarm unit 153 may vibrate the mobile terminal 100 through vibration means using a feedback to the key signal input. The user can recognize an occurrence of the through vibration as described above. The signal for notifying an occurrence of the event may be outputted through the display unit 151 or the audio output module 152.

The haptic module 154 generates various tactile effects felt by the user. A typical example of the tactile effects generated by the haptic module 154 is vibration. Intensity, pattern, or the like, generated by the haptic module 154 can be controlled. For example, different vibrations may be combined and outputted or sequentially outputted.

The haptic module 154, in addition to vibration, may generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

The haptic module 154 may be implemented to feel a tactile effect through muscular senses by a finger or arm of the user as well as to transfer a tactile effect through direct contact. There may exist two or more haptic modules 154 according to its configuration. The haptic module 154 may be provided at a place frequently being contacted by the user in a vehicle. For example, it may be provided on a steering wheel, a gearshift lever, a seat, or the like.

The memory 160 may store software programs for processing and controlling the controller 180, or may temporarily store data (for example, phonebook, message, still image, video, and the like) that are inputted and/or outputted.

The memory 160 may include at least one type of storage medium including a Flash memory type, a hard disk type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disk, an optical disk, and the like. Also, the mobile communication terminal 100 may run a web storage that performs the storage function of the memory 160 over the Internet, or operate in association with the web storage.

The interface unit 170 serves as an interface to every external device that may be connected with the mobile terminal 100. For example, the interface unit 170 may include a wired or wireless headset port, an external battery charger port, a wired or wireless data port, a memory card port, a ports for connecting a device having an identification module, an audio input/output (I/O) port, an video input/output (I/O) port, an earphone port, and the like. Here, the identification module, as a chip that stores various information for authenticating the authority to use the mobile terminal 100, may include a user identity module (UIM), a subscriber identity module (SIM), a universal subscriber identity module (USIM), and the like. In addition, the device having the identification module (hereinafter, 'identifying device') may be made in a form of smart card. Accordingly, the identifying device may be connected with the mobile terminal 100 through a port. The interface unit 170 is provided to receive data or power from an external device and transfer the received data or power to every element within the mobile terminal 100 or may be used to transfer data within the mobile terminal to an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal 100 therethrough. Various command signals or the power inputted from the cradle may operate as a signal for recognizing when the mobile terminal is properly mounted on the cradle.

The controller 180 typically controls a general operation of the mobile terminal 100. For example, the controller 180 performs a control and processing operation associated with a voice call, a data communication, a video phone call, and the like. In addition, the controller 180 may include a multimedia module 181 for reproducing multimedia content. The multimedia module 181 may be provided within the controller 180 or may be separately provided from the controller 180.

The controller 180 may perform a pattern recognition processing to recognize a handwriting or picture-drawing input performed on the touch screen as a character or image, respectively.

The power supply unit 190 receives external or internal power to supply the power required for an operation of each element under a control of the controller 180.

The function of an element applied to the mobile terminal 100 may be implemented in a computer-readable medium using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180. For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180. The voice recognition module 182 recognizes a voice uttered by a user, and performs a relevant function based on the recognized voice signal.

A navigation session 300 applied to the mobile communication terminal 100 displays a travel path on data map.

Figure 3:
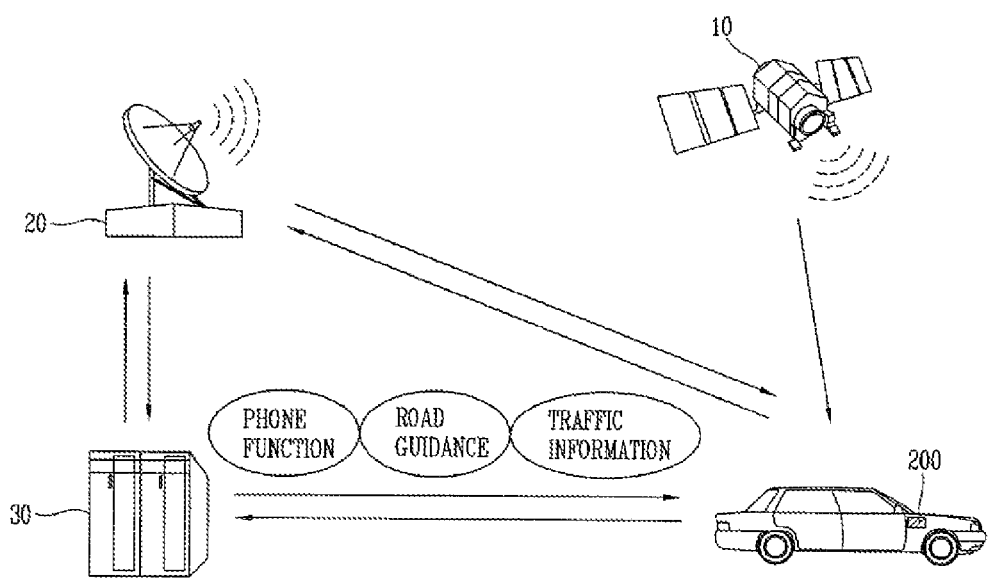
FIG. 3 is a block diagram illustrating a vehicle navigation system for explaining an embodiment of the present invention.

FIG. 3 is a block diagram illustrating a vehicle navigation system for explaining an embodiment of the present invention.

As illustrated in FIG. 3, the vehicle navigation system may be configured by including an information providing center 30 for providing traffic information and various data (for example, programs, execution files, etc.), and a telematics terminal 200 mounted within a vehicle for receiving traffic information through a long-range wireless communication network 20 and/or a short-range wireless communication network, and providing a road guide service based on a GPS signal received through a satellite 10 and the traffic information.

Hereinafter, a configuration of a telematics terminal 200 for explaining according to an embodiment of the present invention will be described with reference to FIG. 4.

Figure 4:
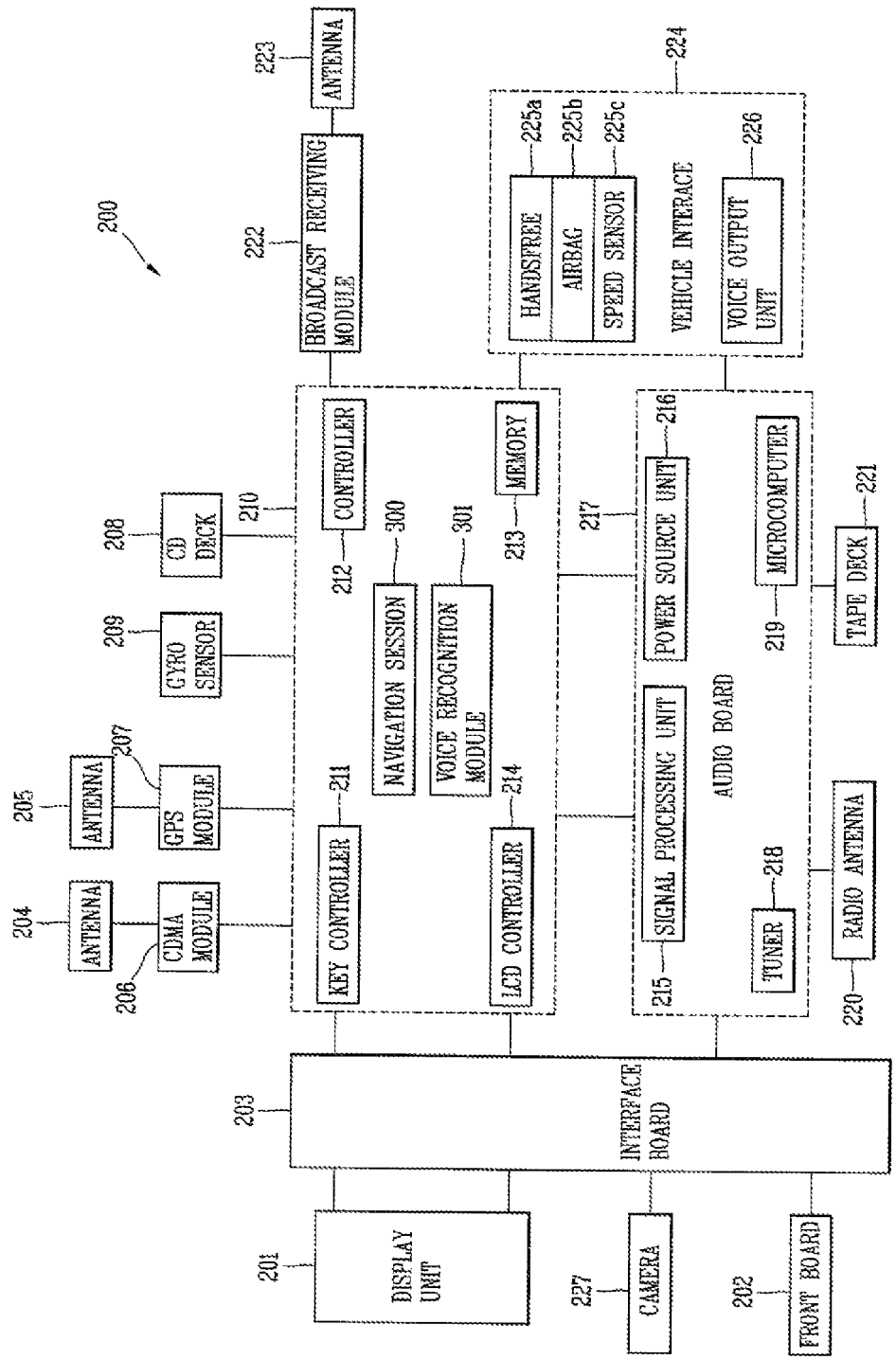
FIG. 4 is a block diagram illustrating a configuration of a telematics terminal for explaining an embodiment of the present invention.

FIG. 4 is a block diagram illustrating a configuration of a telematics terminal 200 for explaining an embodiment of the present invention.

As illustrated in FIG. 4, the telematics terminal 200 may include a central processing unit (CPU) 212 for performing an overall control of the telematics terminal 200, a memory 213 for storing a variety of information, a key controller 211 for controlling a variety of key signals, and a main board 210 having an LCD controller 214 for controlling an liquid crystal display device (LCD) therein.

The memory 213 stores map information (map data) for displaying road guide information on a digital map. In addition, the memory 213 stores information for an algorithm of controlling traffic information collection to allow an input of traffic information depending on a road condition in which a vehicle is currently traveling, and for controlling the algorithm.

The main board 210 may include a code division multiple access (CDMA) module 206 serving as a mobile communication terminal built in a vehicle which is given with a unique device number, a GPS module 207 for receiving a GPS signal to guide a location of a vehicle, track a traveling path from a departure to a destination, etc., and for transmitting traffic information collected by the user as a global positioning system (GPS) signal, a CD deck 208 for reproducing a signal recorded on a compact disk (CD), a gyro sensor 209, and the like. The CDMA module 206 and the GPS module 207 are configured to transmit and receive a signal through antennas 204 and 205.

In addition, a broadcast receiving module 222 is connected to the main board 210 and receives broadcast signals through the antenna 223. The main board 210 is connected via an interface board 203 to a display unit (LCD) 201 controlled by the LCD controller 214, a front board 202 controlled by a key controller 211, and a camera 227 for capturing an inside and/or outside of the vehicle. The display unit 201 displays a variety of video signals and text signals, and the front board 202 is provided with buttons for allowing an input of a variety of key signals so as to provide a key signal corresponding to a button selected by the user to the main board 210. In addition, the display unit includes a proximity sensor and a touch sensor (touch screen) of FIG. 2.

The front board 202 is provided with a menu key for allowing a direct input of traffic information, and the menu key may be configured to be controlled by the key controller 211.

The audio board 217 is connected to the main board 210 and processes a variety of audio signals. The audio board 217 may include a microcomputer 219 for controlling the audio board 217, a tuner 218 for receiving a radio signal, a power unit 216 for supplying power to the microcomputer 219, and a signal processing unit 215 for processing a variety of voice signals.

In addition, the audio board 217 is configured to have a radio antenna 220 for receiving a radio signal and a tape deck 221 for playing an audio tape. The audio board 217 may further include an audio output unit (amplifier) 226 for outputting a voice signal processed by the audio board 217.

The audio output unit (amplifier) 226 is connected to a vehicle interface 224. In other words, the audio board 217 and the main board 210 are connected to the vehicle interface 224. A hands-free unit 225a for inputting a voice signal, an airbag 225b for passenger safety, a speed sensor 225c for detecting a vehicle speed and the like may be connected to the vehicle interface 224. The speed sensor 225c calculates a vehicle speed, and provides the calculated vehicle speed information to the central processing unit 212.

Meanwhile, the mobile vehicle navigation apparatus 300 applied to the telematics terminal 200 generates road guide information based on map data and current vehicle location information, and notifies the generated road guide information to the user.

The display unit 201 senses a proximity touch within the display window through a proximity sensor. For example, when a pointer (for example, finger or stylus pen) is proximity-touched, the display unit 201 detects the position of the proximity touch, and outputs position information corresponding to the detected position to the controller 212.

The voice recognition device (or voice recognition module) 301 recognizes a voice uttered by a user, and performs a relevant function based on the recognized voice signal.

A navigation session 300 applied to the mobile communication terminal 200 displays a travel path on data map, and automatically forms a wireless network together with a terminal (for example, vehicle navigation device) mounted on a neighboring vehicle and/or a mobile communication terminal carried by a neighboring pedestrian through a wireless communication (for example, short-range wireless communication network) when the location of the mobile communication terminal 100 is within a predetermined distance from a dead zone included in the travel path, thereby receiving the location information of the neighboring vehicle from the terminal mounted on the neighboring vehicle, and receiving the location information of the neighboring pedestrian from the mobile communication terminal carried by the neighboring pedestrian.

On the other hand, the broadcast receiving module 222 may receive a broadcast signal including traffic information in a TPEG format from the broadcasting station through an antenna 223. The broadcast signal includes video and audio data according to various specifications, such as terrestrial or satellite digital multimedia broadcasting (DMB), digital audio broadcasting (DAB), digital video broadcasting (DVB-T, DVB-H), and the like. In addition, the broadcast signal includes traffic information according to traffic information (TPEG) services and binary format for scene (BIFS) data services, and supplementary information such as various supplementary data. Moreover, the broadcast signal receiver 222 synchronizes a signal bandwidth provided with traffic information, demodulates the synchronized signal, and outputs the decoded signal to the TPEG decoder (included in a controller 407).

The TPEG decoder decodes traffic information in a TPEG format and provides a variety of information including traffic lights information included in the traffic information to the controller 212.

Hereinafter, the format of TPEG information will be described with reference to FIG. 5.

Figure 5:
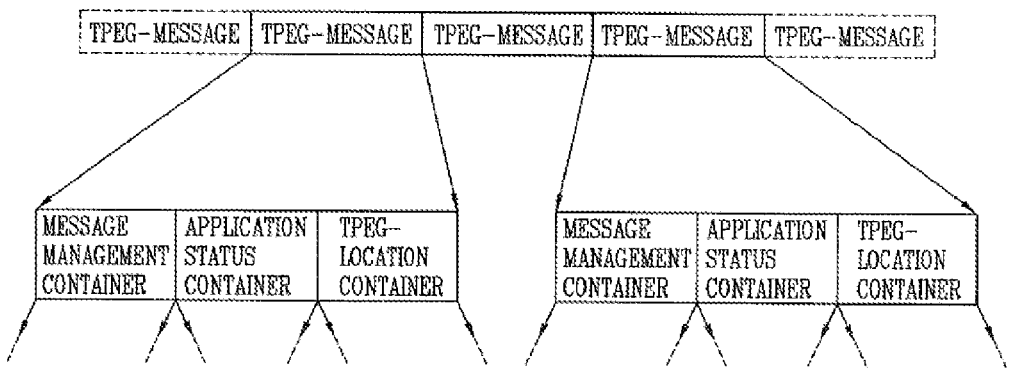
FIG. 5 is a view illustrating a format of TPEG information according to this embodiment.

FIG. 5 is a view illustrating the format of TPEG information according to an embodiment of the present invention.

Referring to FIG. 5, TPEG information includes a sequence of message segments (hereinafter, referred to as 'TPEG message').

The message segments may be applied to different applications. For instance, each TPEG message can be applied to any one of a TPEG-congestion and travel-time information application, a TPEG-road traffic message application, a TPEG-public transport information application, a TPEG-multimedia based traffic and travel information application, and other applications. In this embodiment, traffic lights information can be applied any one of the foregoing applications.

A unique identification number referred to as application identification (AID) is assigned to each TPEG application. The application identification is used to decode a received TPEG message using the most appropriate application decoder.

The road traffic message application is assigned an AID 0001 (hex), the TPEG CTT is assigned an AID 0010 (hex), and the multimedia based traffic and travel information application is assigned an AID 0008 (hex), and the like.

The TPEG message includes a message management container, an application status container, and a TPEG-location container.

The application status container has different contents according to the type of a TPEG message application. Traffic lights information according to this embodiment may be transmitted in a state of being included in the application status container. As an example, in case where the TPEG message is a TPEG-congestion and travel-time information application (TPEG-CTT), traffic lights information is transmitted in a state of being included in the TPEG-CTT which is an application status container. In this case, the TPEG-CTT container may include congestion and travel time status information, prediction of congestion and travel time status information, additional information, and traffic lights information according to this embodiment.

The congestion and travel time status information includes information on average link speed, travel time, link delay, and congestion time.

The prediction of congestion and travel time status information includes information on prediction of average speed, travel time, prediction of travel time, and congestion tendency.

The additional information describes appended or supplementary information related to congestion and travel time in a text form.

The TPEG decoder decodes a TPEG message included in the broadcast signal to extract traffic lights information, road information, a variety of traffic information included in the TPEG message.

Figure 6:
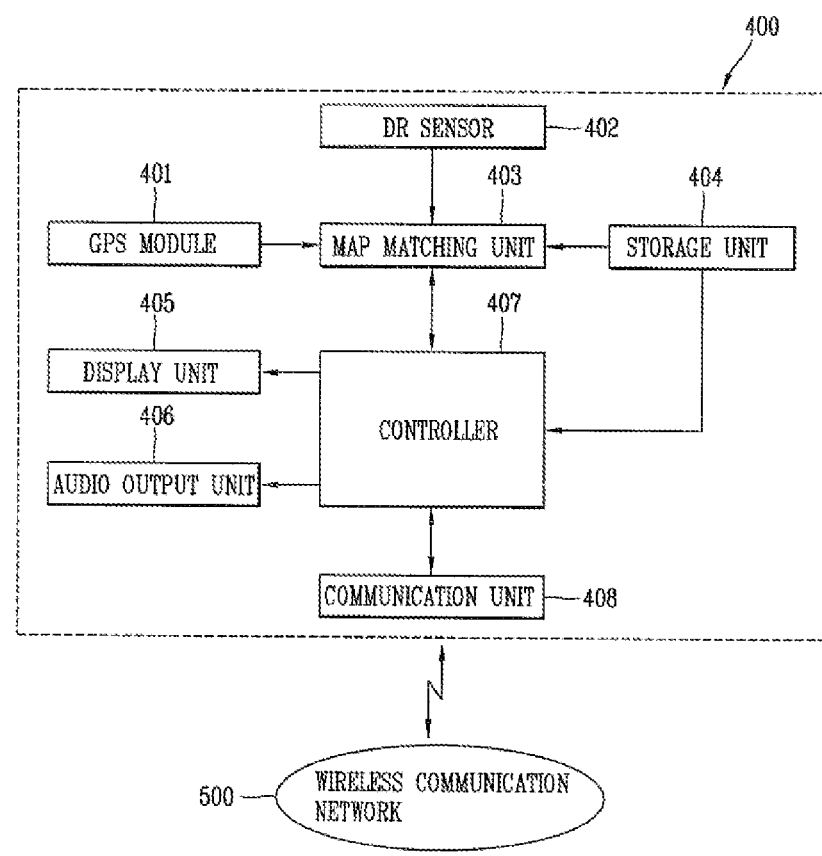
FIG. 6 is a block diagram illustrating a configuration of a navigation (vehicle navigation) apparatus in a mobile terminal according to a first embodiment of the present invention.

FIG. 6 is a block diagram illustrating a configuration of a navigation (vehicle navigation) apparatus 400 in a mobile terminal according to an embodiment of the present invention.

The navigation (vehicle navigation) apparatus 400 can be classified into in-dash type and on-dash type depending on how the navigation vehicle 400 is installed in the vehicle 200. An in-dash type navigation (vehicle navigation) apparatus is the one that is firmly installed by being inserted in a predetermined space assigned in a dashboard of the vehicle 200. An on-dash type navigation (vehicle navigation) apparatus is either attached on a dash board of the vehicle 200 or installed by using a dedicated mount near the dash board. Since the on-dash type navigation (vehicle navigation) can be detached or attached, it can be separated from the vehicle 200 to be carried by the user.

The navigation (vehicle navigation) apparatus 400 according to an embodiment of the present invention includes both the aforementioned in-dash and on-dash type navigation (vehicle navigation) apparatuses. In addition, the navigation (vehicle navigation) apparatus 400 further includes all kinds of information processing devices, such as various portable terminals, capable of receiving and/or processing of traffic information to carry out a navigation function in association with a global positioning system (GPS) receiver receiving navigation messages transmitted from GPS satellites in the vehicle 200.

As illustrated in FIG. 6, the navigation apparatus may include a GPS module 401 for receiving a global positioning system (GPS) signal received from a satellite and generating first vehicle position data of a mobile vehicle navigation apparatus (assumed to be in the same location as the telematics terminal 200 or mobile communication terminal 100) based on the received GPS signal; a dead-reckoning (DR) sensor 402 for generating second vehicle position data based on a traveling direction of a vehicle and the vehicle speed; a storage unit (or memory) 404 for storing map data and various information; a map matching unit 403 for generating an estimated vehicle position based on the first vehicle position data and the second vehicle position data, and matching the generated vehicle position to a link (map matching link or map matching road) in the map data stored in the storage unit 404, and outputting the matched map information (map matching result); a communication unit 408 for receiving real-time traffic information from an information providing center and/or neighboring vehicles through a wireless communication network 500 and carrying out a phone communication; a controller 407 for generating road guide information based on the matched map information (map matching result); a display unit 405 for displaying a road guide map (including POI information) included in the road guide information and the traffic information; and an audio output unit 406 for outputting an audio signal corresponding to road guide voice information (road guide voice message) included in the road guide information or the traffic information.

Here, the communication unit 408 may further include a hands-free having a Bluetooth module.

Furthermore, the road guide information may include various information associated with travel, such as traffic lane information, travel speed limit information, turn-by-turn information, traffic safety information, traffic guide information, vehicle information, road search information, and the like, as well as map data.

The signal received through the GPS module 401 may be configured to provide the location information of a terminal to the navigation apparatus 400 using wireless communication methods proposed by the Institute of Electrical and Electronics Engineers (IEEE), such as the IEEE 802.11 Wireless Network Standard for a wireless LAN including wireless LANs, some of infrared communications, etc., the IEEE 802.15 Standard for a wireless personal area network (PAN) including Bluetooth, UWB, ZigBee, etc., the IEEE 802.16 Standard for a wireless metropolitan area network (MAN) broadband wireless access (BWA) including fixed wireless accesses (FWA), etc., and the IEEE 802.20 Mobile Internet Standard for a wireless MAN mobile broadband wireless access (MBWA) including Wibro, WiMAX, etc.

An input unit may be further provided in the navigation apparatus 400, and the input unit selects the user's desired function or receives information, and various devices may be used such as a keypad, a touch screen, a jog shuttle, a microphone, and the like.

The map matching unit 403 generates an estimated location of the vehicle on the basis of the first location data and the second location data, and reads map data corresponding to a travel path from the storage unit 404.

The map matching unit 403 matches the estimated location of the vehicle with a link (road) included in the map data, outputs the matched map information (map-matched result) to the controller 407. For example, the map matching unit 403 generates an estimated location of the vehicle on the basis of the first location data and the second location data, matches the generated estimated location of the vehicle with links within the map data stored in the storage unit 404 based upon the link sequence thereof, and outputs the matched map information (map-matched result) to the controller 407. The map matching unit 403 may output road attribute information such as single lane or double lane roads included in the matched map information (map-matched result) to the controller 407. Furthermore, the function of the map matching unit 403 may be implemented by the controller 407.

The storage unit 404 stores map data. At this time, the stored map data may include a geographic coordinate (or longitude and latitude coordinate) for displaying the longitude and latitude in the Degree/Minute/Second (DMS) unit. Here, the stored map data may use the Universal Transverse Mercator (UTM) coordinate, the Universal Polar System (UPS) coordinate, the Transverse Mercator (TM) coordinate, and the like, in addition to the geographic coordinate.

The storage unit 404 stores various information, such as various menu screens, points of interest (hereinafter, "POI"), function characteristic information based upon specific locations of the map data, and the like.

The storage unit 404 stores various user interfaces (UI) and/or graphic user interfaces (GUI).

The storage unit 404 stores data, programs, and the like, which are required for operating the navigation device 400.

The storage unit 404 stores destination information inputted from the user through the input unit. Here, the destination information may be a destination, or either one of a departure and a destination.

The display unit 405 displays image information (or road guide map) included in the road guide information generated by the controller 407. Here, the display unit 405 may include a touch sensor (touch screen) or proximity sensor. Furthermore, the road guide information may include various information associated with driving a vehicle, such as traffic lane information, driving speed limit information, turn-by-turn information, traffic safety information, traffic guide information, vehicle information, road search information, and the like, in addition to map data.

Furthermore, when displaying the image information, the display unit 405 may display various contents, such as various menu screens, road guide information, and the like, using user interfaces and/or graphic user interfaces included in the storage unit 404. Here, the contents displayed on the display unit 405 include various text or image data (including map data or various information data), and menu screens including icons, list menus, combo boxes, and the like.

The audio output unit 406 outputs voice information (or voice messages for road guide information) included in the road guide information generated by the controller 407. Here, the audio output unit 406 may be an amplifier or speaker.

The controller 407 generates road guide information on the basis of the matched map information, and outputs the generated road guide information to the display unit 405 and audio output unit 406. Here, the display unit 405 displays the road guide information.

The controller 407 receives real-time traffic information from the information providing center and/or a terminal mounted on a neighboring vehicle (vehicle navigation device) to generate road guide information.

Furthermore, the controller 407 is connected with a call center through a communication unit 408 to perform a phone call, transmit or receive information between the navigation device 400 and the call center. Here, the communication unit 408 may further include a hands-free module having a Bluetooth function using a short-range wireless communication method.

On the other hand, the controller 407 searches a destination from map data stored in the storage unit 404, displays the searched destination on the display unit 405, and displays an icon for searching nearby points of interest (POI) on the displayed destination. Furthermore, the controller 407 searches a point of interest from the map data, displays the searched point of interest on the display unit 405, and displays an icon for searching nearby points of interest on the displayed point of interest. For example, the controller 407 displays an icon for searching points of interest within a preset radius on the basis of the displayed destination on the displayed destination, or displays an icon for searching points of interest within a preset radius on the basis of the displayed point of interest on the displayed point of interest.

Hereinafter, a navigation method of a mobile terminal and an apparatus thereof according to a first embodiment of the present invention will be described with reference to FIGS. 6 through 11. Here, a navigation apparatus and a method thereof according to a first embodiment of the present invention may be applicable to various terminals such as a smart phone, a notebook computer, a personal digital assistant (PDA), a portable multimedia player (PMP), and the like, as well as a mobile communication terminal 100, a telematics terminal 200, and a vehicle navigation device 400.

Figure 7:
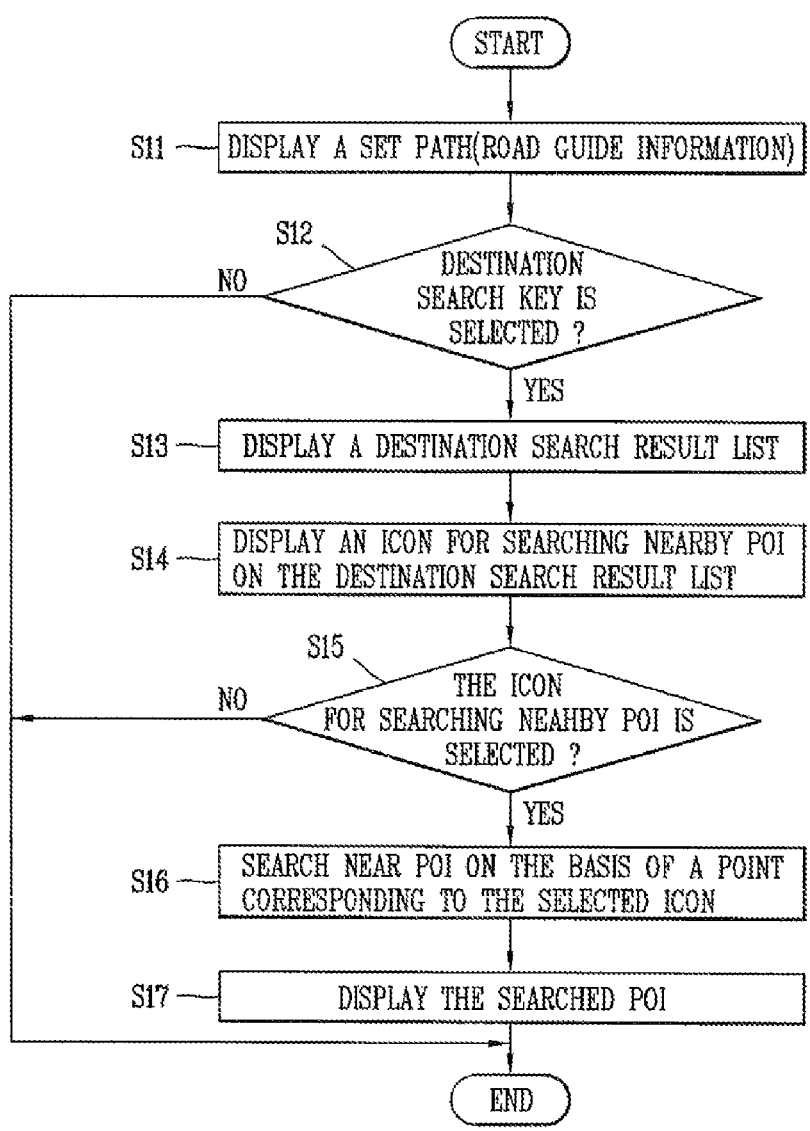
FIG. 7 is a flow chart illustrating a navigation method of a mobile terminal according to a first embodiment of the present invention.

FIG. 7 is a flow chart illustrating a navigation method of a mobile terminal according to a first embodiment of the present invention.

First, when a path (road guide information) from a current location to a destination is set by the user, the controller 407 displays the set path through the display unit 405 (S11).

The controller 407 determines whether or not a destination search key among various keys (for example, destination key, menu key, road guide key, POI search key) being displayed together with the path is selected by the user (S12).

Figure 8:
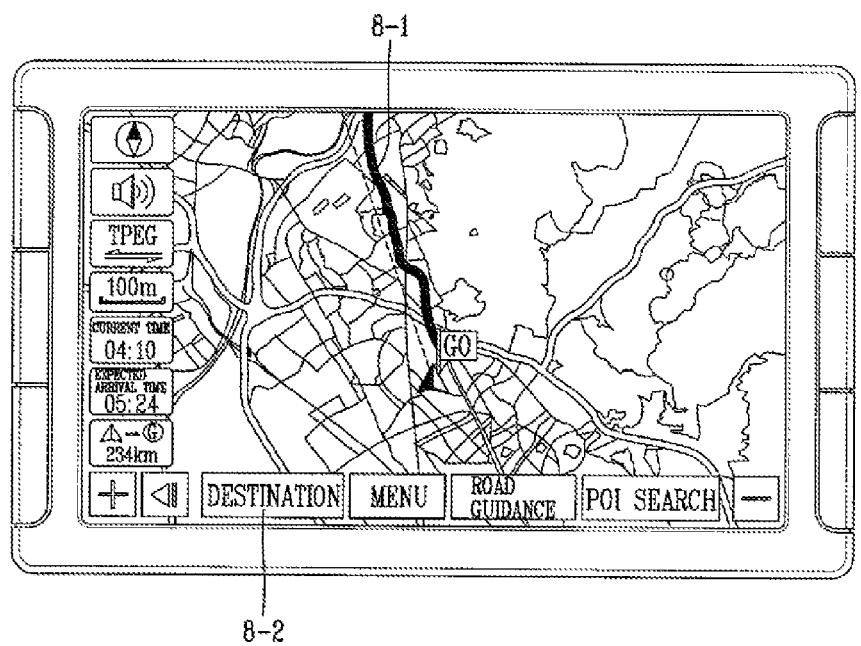
FIG. 8 is a view illustrating a destination search key according to a first embodiment of the present invention.

FIG. 8 is a view illustrating a destination search key according to a first embodiment of the present invention.

As illustrated in FIG. 8, the controller 407 determines whether or not a destination search key 8-2 is selected by the user among the destination key 8-2, a menu key, a road guide key, a POI search key displayed together with a path 8-1. Here, the controller 407 displays the travel path 8-1 from a current location of the vehicle to a destination on a map (digital map).

When the destination search key 8-2 is selected by the user, the controller 407 displays a keypad on the display unit 405, thereby allowing the user to input his or her desired destination.

Figure 9:
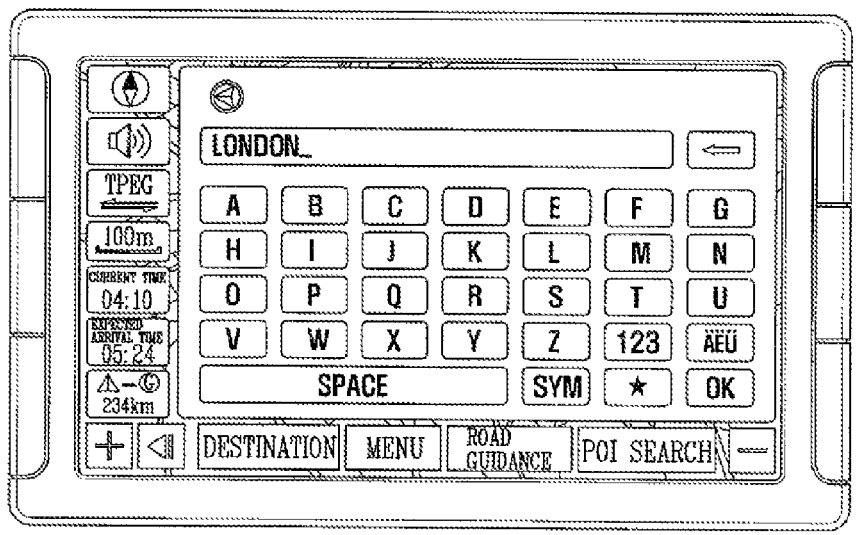
FIG. 9 is a view illustrating a keypad according to a first embodiment of the present invention.

FIG. 9 is a view illustrating a keypad according to a first embodiment of the present invention.

As illustrated in FIG. 9, when the destination search key 8-2 is selected by the user, the controller 407 displays a keypad on the display unit 405, thereby allowing the user to input his or her desired destination (for example, London).

If a destination is inputted by the user through the keypad, then the controller 407 searches the destination from the storage unit 404, and displays the searched destination result list on the display unit 405 (S13).

Figure 10:
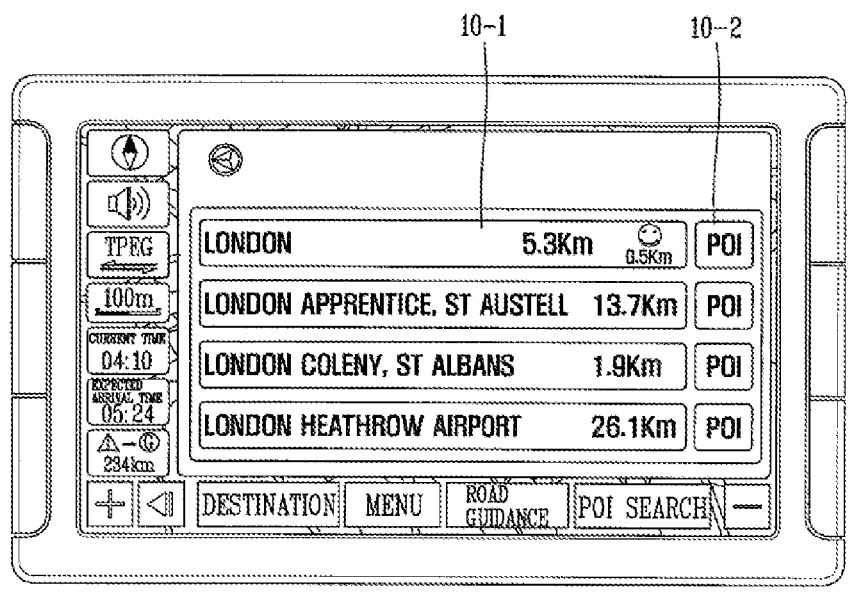
FIG. 10 is a view illustrating a destination result list according to a first embodiment of the present invention.

FIG. 10 is a view illustrating a destination result list according to a first embodiment of the present invention.

As illustrated in FIG. 10, if a destination is inputted by the user through the keypad, then the controller 407 searches the destination from the storage unit 404, and displays a destination result list 10-1 associated with the searched destinations on the display unit 405. At this time, the controller 407 displays an icon 10-2 for searching points of interest within a preset radius (for example, 5 km) on the basis of the displayed destination (for example, London) on the right of the displayed destination 10-1 (S14). Here, the preset radius may be changed by the user or designer, and the icon 10-2 may be displayed on the left or right of the displayed each destination result.

The controller 407 determines whether or not an icon 10-2 for searching points of interest within a preset radius (for example, 5 km) on the basis of the displayed destination (for example, London) is selected by the user (S15), and searches points of interest within a preset radius (for example, 5 km) on the basis of the displayed destination (for example, London) from the storage unit 404 when the icon 10-2 is selected by the user (S16).

The controller 407 displays the searched point of interest (point of interest list) on the display unit 405 (S17).

Figure 11:
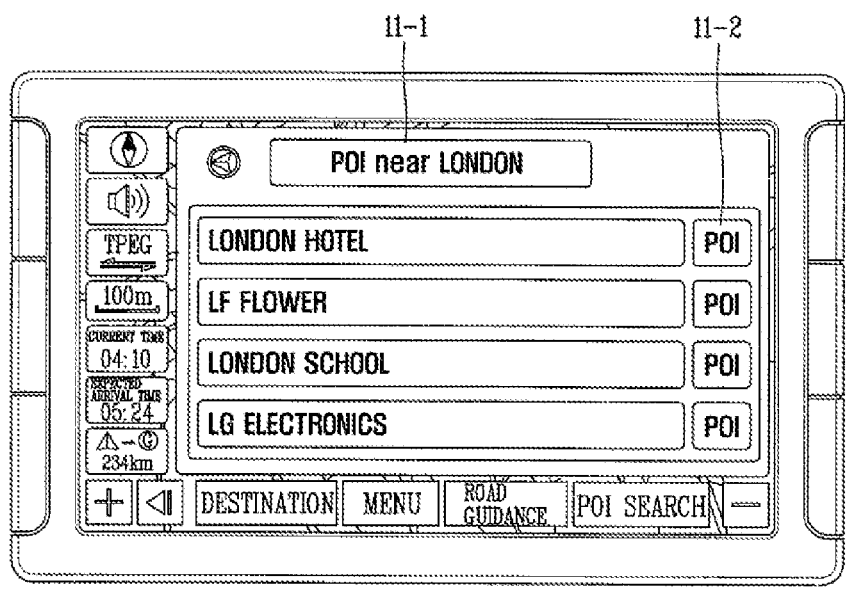
FIG. 11 is a view illustrating a nearby point of interest list according to a first embodiment of the present invention.

FIG. 11 is a view illustrating a nearby point of interest list according to a first embodiment of the present invention.

As illustrated in FIG. 11, the controller 407 determines whether or not an icon 10-2 for searching points of interest within a preset radius (for example, 5 km) on the basis of the displayed destination (for example, London) is selected by the user, and searches points of interest (for example, hotels, flower shops, schools, LG Electronics, etc.) within a preset radius (for example, 5 km) on the basis of the displayed destination (for example, London) from the storage unit 404 when the icon 10-2 is selected by the user, and displays the searched points of interest (POI list) on the display unit 405. At this time, the controller 407 may display an icon 11-2 for searching points of interest (nearby points of interest) within a preset radius (for example, 5 km) on the basis of each point of interest on the each point of interest of the displayed points of interest (POI list) 11-1.

Accordingly, a navigation apparatus and a method thereof according to a first embodiment of the present invention searches a destination from the map data, displays the searched destination on the display unit, and displays an icon for searching nearby points of interest of the destination on the displayed destination, thereby solving a frequent problem of searching convenient facilities such as restaurant, hotel, gas station, rest area, and the like, near a destination whenever searching the relevant destination, as well as solving an inconvenient problem in which the user must perform a search to find neighboring facilities for each type of facility after setting a destination at the center thereof.

Hereinafter, a navigation method of a mobile terminal and an apparatus thereof according to a second embodiment of the present invention will be described with reference to FIGS. 6, and 12 through 14. Here, a navigation apparatus and a method thereof according to a second embodiment of the present invention may be applicable to various terminals such as a smart phone, a notebook computer, a personal digital assistant (PDA), a portable multimedia player (PMP), and the like, as well as a mobile communication terminal 100, a telematics terminal 200, and a vehicle navigation device 400.

Figure 12:
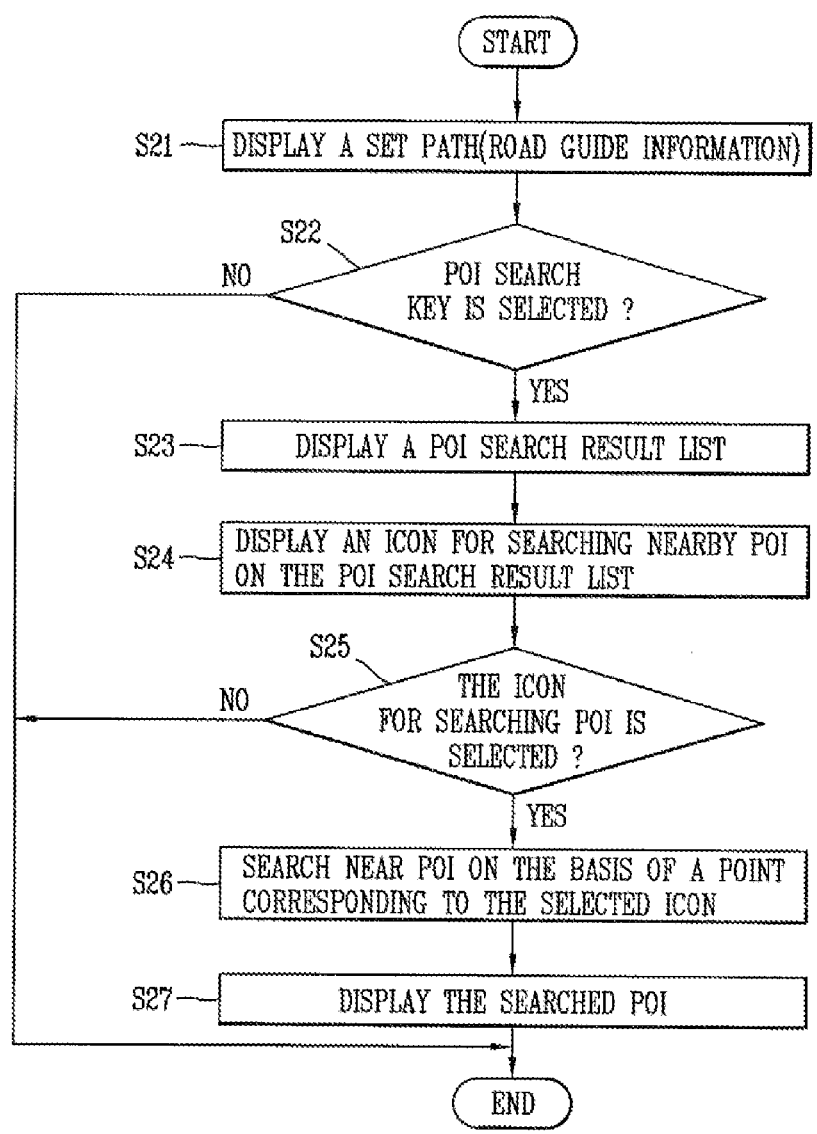
FIG. 12 is a flow chart illustrating a navigation method of a mobile terminal according to a second embodiment of the present invention.

FIG. 12 is a flow chart illustrating a navigation method of a mobile terminal according to a second embodiment of the present invention.

First, when a path (road guide information) from a current location to a destination is set by the user, the controller 407 displays the set path through the display unit 405 (S21).

The controller 407 determines whether or not a point of interest (POI) search key among various keys (for example, a destination key, a menu key, a road guide key, and a POI search key) being displayed together with the path is selected by the user (S22).

Figure 13:
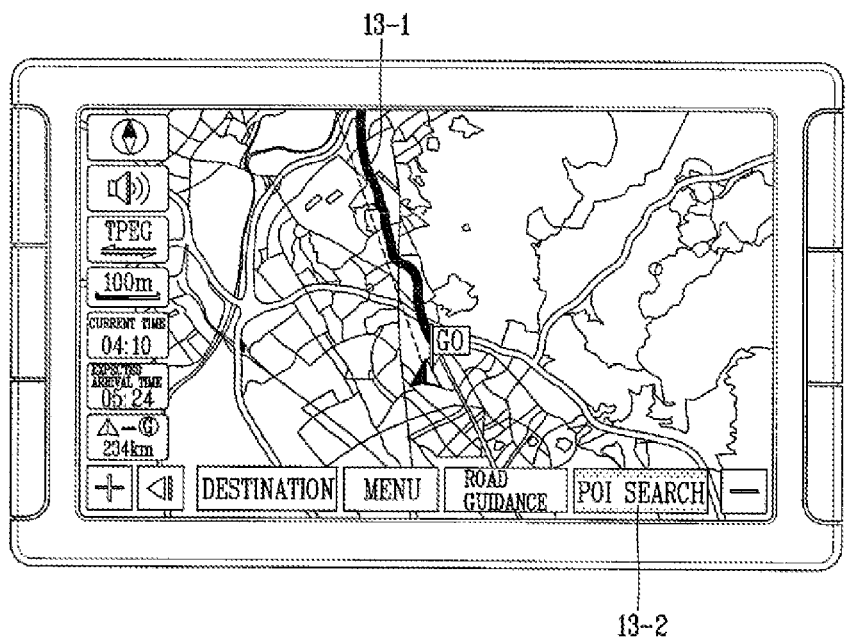
FIG. 13 is a view illustrating a POI search key according to a second embodiment of the present invention.

FIG. 13 is a view illustrating a POI search key according to a second embodiment of the present invention.

As illustrated in FIG. 13, the controller 407 determines whether or not a POI search key 13-2 is selected by the user among a destination key, a menu key, a road guide key, the point of interest (POI) search key being displayed together with a path 13-1. Here, the controller 407 displays a travel path 13-1 from a current location of the vehicle to a destination on a map (digital map).

When the POI search key 13-2 is selected by the user, the controller 407 displays a POI list on the display unit 405, thereby allowing the user to input his or her desired point of interest.

Figure 14:
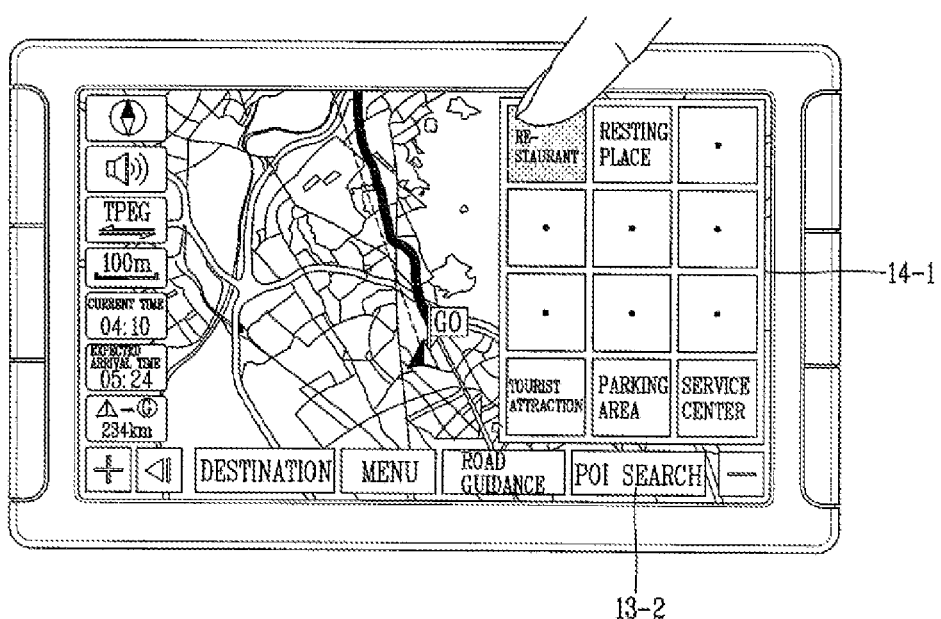
FIG. 14 is a view illustrating a point of interest list according to a second embodiment of the present invention.

FIG. 14 is a view illustrating a point of interest list according to a second embodiment of the present invention.

As illustrated in FIG. 14, when the POI search key 13-2 is selected by the user, the controller 407 displays a POI list 14-1 on the display unit 405. For example, the controller 407 displays a POI list 14-1 including various points of interest (POI information) such as restaurant, rest area, tourist attraction, parking area, service center, gas station, and the like, on the display unit 405.

The controller 407 determines whether or not a particular POI (for example, restaurant) is selected on the POI list 14-1. For example, the controller 407 determines whether or not any one of restaurant, gas station, rest area, tourist attraction, parking area, and service center is selected by the user.

When a particular POI (for example, restaurant) is selected on the POI list 14-1 by the user, the controller 407 searches the selected particular POI (for example, restaurant) from the storage unit 404, and displays the searched POI result list on the display unit 405 (S23). For example, if a particular POI (for example, restaurant) is selected by the user, then the controller 407 searches the particular POI (for example, restaurant) from the storage unit 404, and displays a POI result list associated with the searched particular POI (for example, restaurant) on the display unit 405. At this time, the controller 407 displays an icon for searching points of interest within a preset radius (for example, 5 km) on the basis of the displayed points of interest (for example, any one POI among restaurant A, restaurant B, and restaurant C) on the right of the displayed POI (S24). Here, the preset radius may be changed by the user or designer, and the icon 10-2 may be displayed on the left or right of the displayed each point of interest result.

The controller 407 determines whether or not an icon for searching points of interest within a preset radius (for example, 5 km) on the basis of the displayed POI (for example, restaurant A) is selected by the user (S25), and searches points of interest within a preset radius (for example, 5 km) on the basis of the displayed POI (for example, restaurant A) from the storage unit 404 when the icon is selected by the user (S26).

The controller 407 displays the searched points of interest (POI list) on the display unit 405 (S27).

Accordingly, a navigation apparatus and a method thereof according to a second embodiment of the present invention searches a POI from the map data, displays the searched POI on the display unit, and displays an icon for searching nearby points of interest of the POI on the displayed POI, thereby solving a frequent problem of searching convenient facilities such as restaurant, hotel, gas station, rest area, and the like, near a POI whenever searching the relevant POI, as well as solving an inconvenient problem in which the user must perform a search for neighboring facilities for each type of facility after setting a POI at the center thereof.

Hereinafter, a navigation method of a mobile terminal and an apparatus thereof according to a third embodiment of the present invention will be described with reference to FIGS. 6, 15 and 16. Here, a navigation apparatus and a method thereof according to a third embodiment of the present invention may be applicable to various terminals such as a smart phone, a notebook computer, a personal digital assistant (PDA), a portable multimedia player (PMP), and the like, as well as a mobile communication terminal 100, a telematics terminal 200, and a vehicle navigation device 400.

Figure 15:
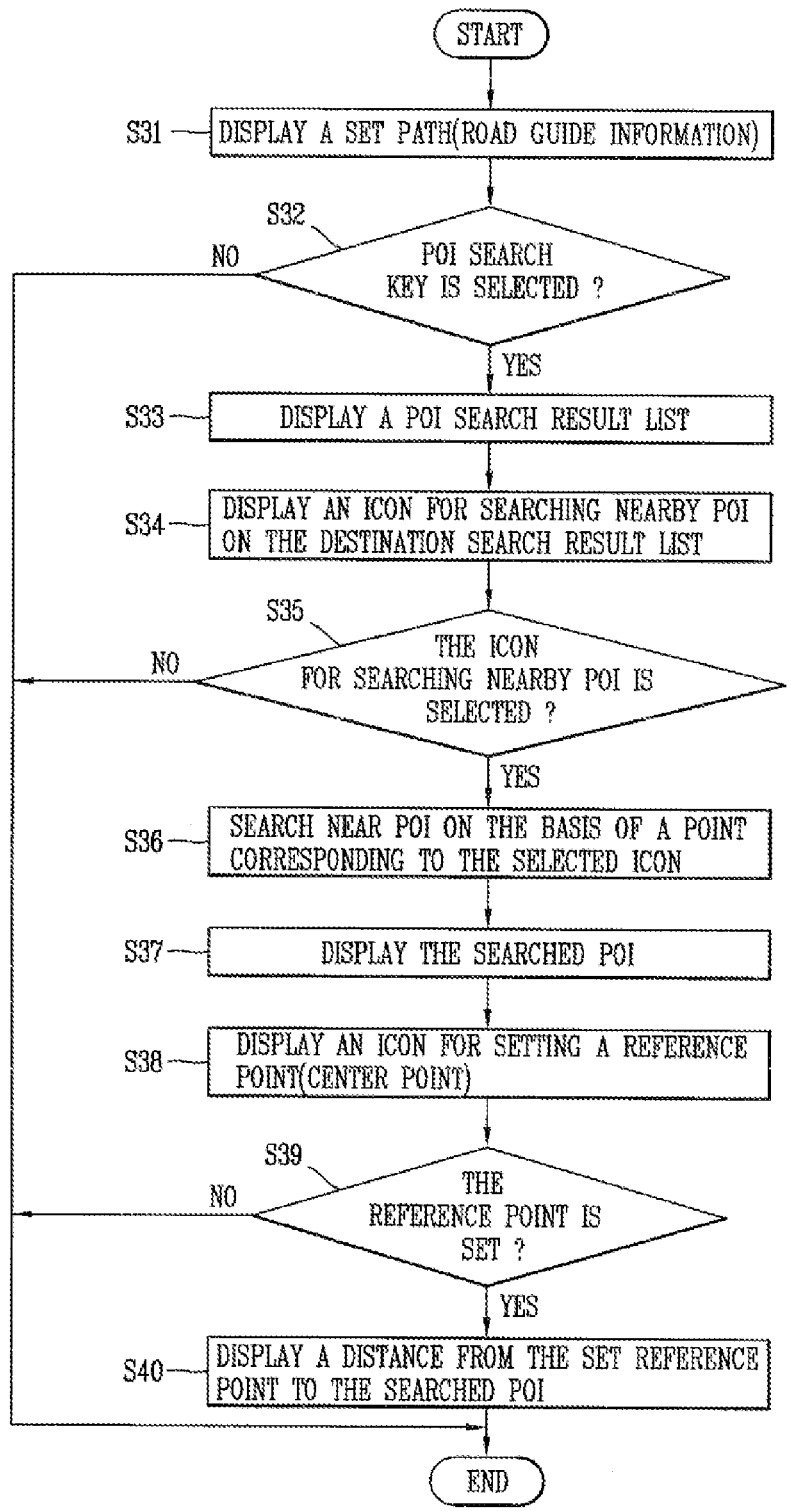
FIG. 15 is a flow chart illustrating a navigation method of a mobile terminal according to a third embodiment of the present invention.

FIG. 15 is a flow chart illustrating a navigation method of a mobile terminal according to a third embodiment of the present invention.

First, when a path (road guide information) from a current location to a destination is set by the user, the controller 407 displays the set path through the display unit 405 (S31).

The controller 407 determines whether or not a destination search key among various keys (for example, a destination key, a menu key, a road guide key, a POI search key) being displayed together with the path is selected by the user (S32). For example, the controller 407 determines whether or not a destination search key among the destination key, a menu key, a road guide key and a POI search key being displayed together with the path is selected by the user.

When the destination search key is selected by the user, the controller 407 displays a keypad on the display unit 405, thereby allowing the user to input his or her desired destination. For example, when the destination search key is selected by the user, the controller 407 displays a keypad on the display unit 405, thereby allowing the user to input his or her desired destination (for example, London).

If a destination is inputted by the user through the keypad, then the controller 407 searches the destination from the storage unit 404, and displays the searched destination result list on the display unit 405 (S33). For example, if a destination is inputted by the user through the keypad, then the controller 407 searches the destination from the storage unit 404, and displays a destination result list 10-1 associated with the searched destination on the display unit 405. At this time, the controller 407 displays an icon for searching points of interest within a preset radius (for example, 5 km) on the basis of the displayed destination (for example, London) on the right of the displayed destination (S34). Here, the preset radius may be changed by the user or designer, and the icon may be displayed on the left or right of the displayed each destination result.

The controller 407 determines whether or not an icon for searching points of interest within a preset radius (for example, 5 km) on the basis of the displayed destination (for example, London) is selected by the user (S35), and searches points of interest within a preset radius (for example, 5 km) on the basis of the displayed destination (for example, London) from the storage unit 404 when the icon is selected by the user (S36).

The controller 407 displays the searched points of interest (POI list) on the display unit 405 (S37). For example, the controller 407 determines whether or not an icon for searching points of interest within a preset radius (for example, 5 km) on the basis of the displayed destination (for example, London) is selected by the user, and searches points of interest (for example, hotels, flower shops, schools, LG Electronics, etc.) within a preset radius (for example, 5 km) on the basis of the displayed destination (for example, London) from the storage unit 404 when the icon is selected by the user, and displays the searched points of interest (POI list) on the display unit 405. At this time, the controller 407 may display an icon for searching points of interest (nearby points of interest) within a preset radius (for example, 5 km) on the basis of each POI on the each POI of the displayed points of interest (POI list).

On the other hand, the controller 407 displays an icon (for example, combo box) for setting a reference point (center point) on the top right of the destination search result list or POI search result list (S38). The combo box may include an item for displaying a distance from a prestored point (for example, home) to each destination or each POI within the search result (destination search result, POI search result), an item for displaying a distance from a current location to each destination or each POI within the search result (destination search result, POI search result), and an item for displaying a distance from the set destination to each destination or each POI within the search result (destination search result, POI search result).

Figure 16:
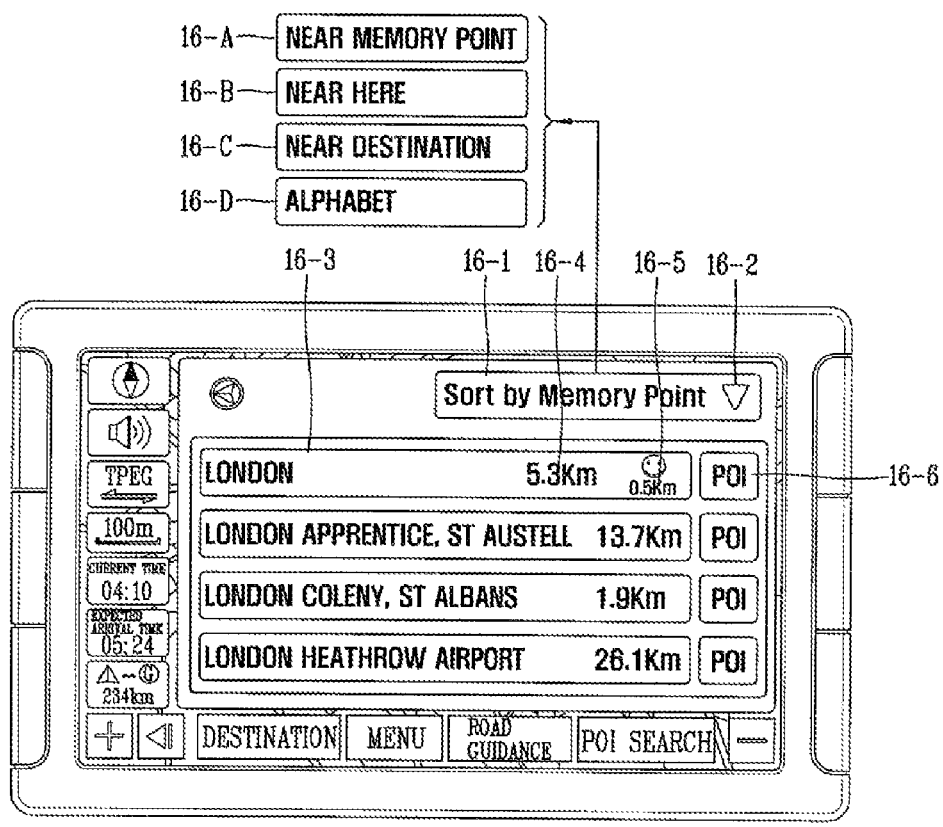
FIG. 16 is a view illustrating a combo box according to a third embodiment of the present invention.

FIG. 16 is a view illustrating a combo box according to a third embodiment of the present invention.

As illustrated in FIG. 16, the controller 407 displays an icon (for example, combo box) 16-1 for setting a reference point (center point) on the top right of the destination search result list and point of interest search result list. The combo box may include a first item (near memory point) 16-A for calculating and displaying a distance from a prestored point (memory point) (for example, home) to each destination or each POI within the search result (destination search result, POI search result), a second item (near here) 16-B for calculating and displaying a distance from a current location to each destination or each POI within the search result (destination search result, POI search result), and a third item (near destination) 16-C for calculating and displaying a distance from the set destination to each destination or each POI within the search result (destination search result, POI search result).

Here, the combo box 16-1 may further include an item (alphabet) 16-D for classifying the search result (destination search result, POI search result) in the order of English alphabet (or Hangeul vowels/consonants). The controller 407 displays a distance 16-4 from a current location to each destination or each POI when displaying each destination 16-3 within the destination search result list or each POI within the POI search result list.

If a combo box for setting the reference point (center point) is displayed and a key 16-2 indicating the items 16-A, 16-B, 16-C, 16-D is selected by the user, then the controller 407 sequentially displays the items 16-A, 16-B, 16-C, 16-D.

If any one (for example, 16-A) of the items 16-A, 16-B, 16-C, 16-D is selected by the user, then the controller 407 sets the selected item to a reference point (center point) (S39). For example, if a first item (for example, 16-A) of the items 16-A, 16-B, 16-C, 16-D is selected by the user, then the controller 407 sets the preset point (memory point) (for example, home) to a reference point. If a second item 16-B of the items 16-A, 16-B, 16-C, 16-D is selected by the user, then the controller 407 sets the current location to a reference point. If a third item 16-C of the items 16-A, 16-B, 16-C, 16-D is selected by the user, then the controller 407 sets the set destination to a reference point.

If the reference point is set, then the controller 407 calculates a distance from the set reference point (for example, preset point, home) to each destination or each POI within the search result (destination search result, POI search result), and generates an icon 16-5 indicating the calculated distance, and displays the generated icon 16-5 on the destination search result list or the POI search list (S40). At this time, the controller 407 may display an icon 16-6 for searching points of interest within a preset radius (for example, 5 km) on the basis of the displayed destination 16-3 (for example, London) on the right of the displayed icon 16-5.

On the other hand, if the reference point is set, then the controller 407 may search points of interest within a preset radius (for example, 5 km) on the basis of the set reference point (for example, prestored point, home) and displays the searched points of interest.

Accordingly, a navigation apparatus of a mobile terminal and a method thereof according to a third embodiment of the present invention may easily check a distance from a reference point to the relevant destination or POI through the reference point setting icon, and may easily search points of interest near the reference point through the reference point setting icon.

As described in detail in the above, a navigation apparatus and a method thereof according to embodiments of the present invention searches a destination from the map data, displays the searched destination on the display unit, and displays an icon for searching nearby points of interest of the destination on the displayed destination, thereby solving a frequent problem of searching convenient facilities such as restaurants, hotels, gas stations, rest areas, and the like, near a destination whenever the user searches the relevant destination, as well as solving an inconvenient problem in which the user must perform a search to find neighboring facilities for each kind of facility after setting a destination at the center thereof.

A navigation apparatus and a method thereof according to embodiments of the present invention searches a point of interest (POI) from the map data, displays the searched POI on the display unit, and displays an icon for searching nearby points of interest of the POI on the displayed POI, thereby solving a problem in which there have been frequently occurred such cases of searching convenient facilities such as restaurants, hotels, gas stations, rest areas, and the like, near a POI whenever the user searches the relevant POI, as well as solving an inconvenient problem in which the user should perform searches for finding neighboring facilities as many times as the number of kinds of the facilities after setting a POI at the center thereof.

A navigation method of a mobile terminal and an apparatus thereof according to embodiments of the present invention can easily check a distance from a reference point to the relevant destination or POI through the reference point setting icon, and can easily search points of interest near the reference point through the reference point setting icon.

It will be apparent to those skilled in this art that various changes and modifications may be made thereto without departing from the gist of the present invention. Accordingly, it should be noted that the embodiments disclosed in the present invention are only illustrative and not limitative to the spirit of the present invention, and the scope of the spirit of the invention is not limited by those embodiments. The scope protected by the present invention should be construed by the accompanying claims, and all the spirit within the equivalent scope of the invention should be construed to be included in the scope of the right of the present invention.

What is claimed is:

1. A navigation apparatus comprising:
    a display unit configured to display map data; and
    a controller configured to:
       search at least one destination from the map data;
       display, on the display unit, a destination search result list comprising the at least one destination;
       display a first icon for searching at least one points of interest (POI) on the basis of the at least one destination on the destination search result list;
       display points of interest (POI) categories comprising at least one nearby POI;
       select at least one POI category from the POI categories;
       search the at least one nearby POI associated with the selected at least one POI category from the map data;
       display the searched at least one nearby POI on the displayed map data,
       display a second icon for displaying a first item, a second item, a third item and a fourth item on the destination search result list;
       display the first item, the second item, the third item and the fourth item on the destination search result list when the second icon is selected;
       calculate and display a first distance from a prestored point to the at least one destination when the first item is selected;
       calculate and display a second distance from a current location of the navigation apparatus to the at least one destination when the second item is selected;
       calculate and display a third distance from a preset destination to the at least one destination when the third item is selected; and
       display a plurality of nearby POIs associated with the selected at least one POI category from the map data in alphabetical order when the fourth item is selected,
       wherein the prestored point and the preset destination are different to each other.

2. The apparatus of claim 1, wherein the controller displays a third icon corresponding with each of the POI categories on the display unit.

3. The apparatus of claim 1, wherein the controller displays at least one icon corresponding with the at least one nearby POI on the displayed map data.

4. The apparatus of claim 1, wherein the controller automatically searches the nearby POI categories of the interest location based on the interest location input.

5. The apparatus of claim 1, wherein the controller is further configured to:
    provide a point of interest (POI) search function on the display unit;
    search for at least one POI associated with a location using the POI search function;
    display on the display unit the POI categories based on the search result; and
    display on the display unit a selectable POI icon for each of the POI categories for obtaining at least one POI associated with the corresponding POI category.

6. The apparatus of claim 1, wherein the controller searches the at least one points of interest (POI) on the basis of the at least one destination when the first icon is selected.

7. The apparatus of claim 5, wherein the display unit displays the POI categories and the selectable POI for each of the POI categories simultaneously.

8. A navigation method, comprising:
    displaying map data on a display unit;
    searching at least one destination from the map data;
    displaying, on the display unit, a destination search result list comprising the at least one destination;
    display a first icon for searching at least one points of interest (POI) on the basis of the at least one destination on the destination search result list;
    displaying points of interest (POI) categories comprising at least one nearby POI associated with a location of the selected destination;
    selecting at least one nearby POI category from the POI categories;

searching at least one nearby POI associated with the selected at least one POI category from the map data;

displaying the searched at least one nearby POI on the displayed map data;

displaying a second icon for displaying a first item, a second item, a third item and a fourth item on the destination search result list;

displaying the first item, the second item, the third item and the fourth item on the destination search result list when the second icon is selected;

calculating and displaying a first distance from a prestored point to the at least one destination when the first item is selected;

calculating and displaying a second distance from a current location of the navigation apparatus to the at least one destination when the second item is selected;

calculating and displaying a third distance from a preset destination to the at least one destination when the third item is selected; and displaying a plurality of nearby POIs associated with the selected at least one POI category from the map data in alphabetical order when the fourth item is selected.

9. The method of claim 8, further comprising simultaneously displaying the POI categories and the at least one nearby POI.

10. The method of claim 8, further comprising:
searching a first point of interest (POI) from the map data, and displaying the first POI on the display unit; and
displaying a third icon for searching points of interest near the first POI.

11. The method of claim 10, wherein said displaying the third icon comprises displaying an icon for searching points of interest within a preset radius of a center, the center being the first POI or the at least one destination.

12. The method of claim 8, further comprising:
searching points of interest within a preset radius of the at least one destination when the first icon is selected and displaying the searched points of interest on the display unit.

* * * * *